A. F. ZAHM.
FLYING MACHINE.
APPLICATION FILED MAR. 21, 1910.

1,107,231.  Patented Aug. 11, 1914.

Witnesses
Geo. A. Bepul.
W. Max. Durall

Inventor
A. F. Zahm
by Wickersham Fisher & Wickersham
Attorneys

UNITED STATES PATENT OFFICE.

ALBERT FRANCIS ZAHM, OF WASHINGTON, DISTRICT OF COLUMBIA.

FLYING-MACHINE.

1,107,231.     Specification of Letters Patent.     Patented Aug. 11, 1914.

Application filed March 21, 1910. Serial No. 550,606.

*To all whom it may concern:*

Be it known that I, ALBERT FRANCIS ZAHM, a citizen of the United States, residing at Washington, in the District of Columbia, have invented certain new and useful Improvements in Flying-Machines; and I do hereby declare the following to be a full, clear, and exact description of the invention, such as will enable others skilled in the art to which it appertains to make and use the same.

This invention relates to flying machines and has for its object to provide such a machine with wing tips or ailerons that will be adjustable in such a manner as to exert a torque about the longitudinal axis or line of flight of the machine with or without, as may be desired, exerting a resulting torque about its vertical axis.

To these ends the invention consists in an aeroplane or flying machine provided with a number of lateral balancing planes or lateral rudders, adjustable to any desired angle with respect to each other, yet free to turn together when desired so as to receive an equal impact from the air during flight and to be in aerodynamical balance about the vertical axis of the machine, together with a device whereby they will exert either equal or unequal torques about said axis, as may be desired by the operator.

Figure 1:
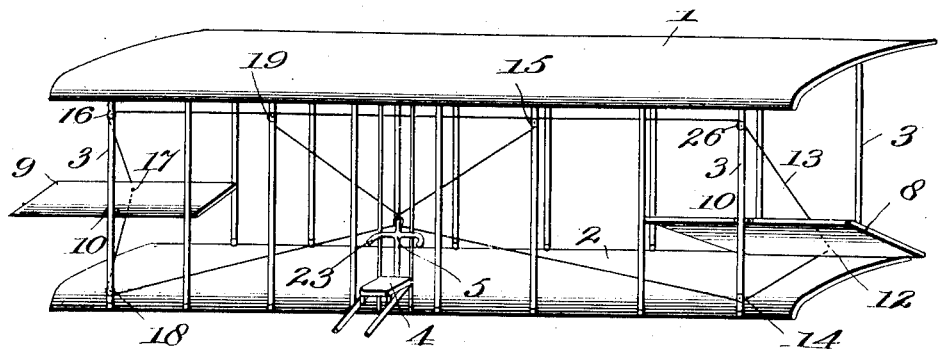
Figure 2:
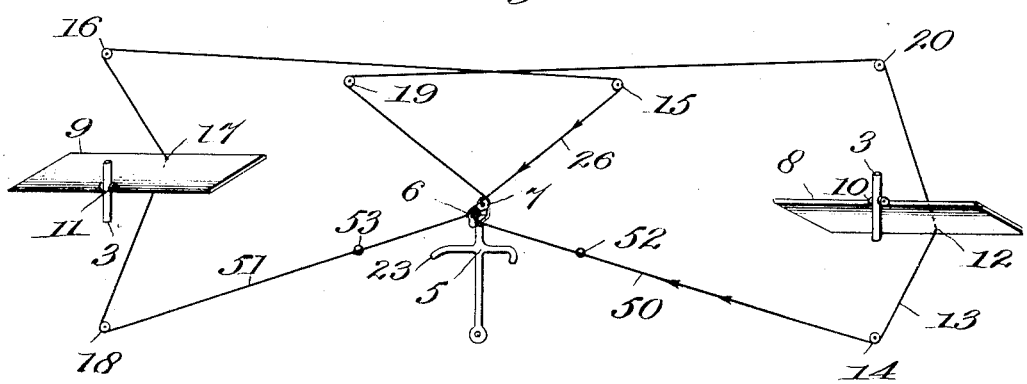
Figure 3:
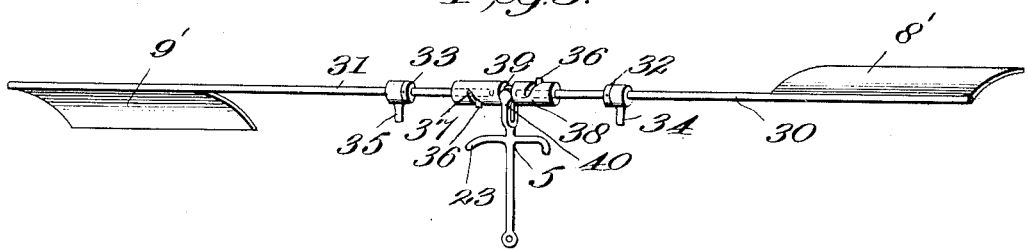

Referring to the accompanying drawings forming a part of this specification, in which like numerals refer to like parts in all the views:—Figure 1, is a diagrammatic elevational view of a well known type of machine with my invention applied thereto; Fig. 2, is a diagrammatic view showing the ailerons and their connections with the yoke under the control of the operator; and Fig. 3, is a diagrammatic view of a modified form of the invention.

The numeral 1, in Fig. 1, indicates any suitable supporting plane below which is placed a similar surface 2 in the type of machine illustrated. The supporting surfaces 1 and 2 are rigidly held together by the rods 3, and suitable steering gear, not shown, is also provided.

4 indicates a seat for the operator and 5 a yoke under his control carrying the pulleys 6 and 7, as shown.

Between the ends of the supporting surfaces 1 and 2 are located the balancing surfaces or ailerons 8 and 9, suitably pivoted to the standards as at 10 and 11. These surfaces may be either curved or plane, preferably the latter in many cases.

Secured to the aileron 8 as at 12, Fig. 2, is a cord 13 which passes over a pulley 14, thence over the pulley 6, thence over the pulley 15 and the pulley 16, thence to the aileron 9, to which it is secured as at 17, thence over the pulley 18, and the pulley 7, over the pulley 19, and the pulley 20, and finally back to the aileron 8, as shown.

As is well known, it is now customary initially, in flight, to so adjust the ailerons that when the machine is flying in balance laterally they will cleave the air edgewise without exerting any tendency to tilt the machine. When in this position said ailerons are parallel to each other and are said to occupy their normal or neutral plane. When the lateral balance is disturbed, however, it is customary to adjust one aileron to a certain angle above the neutral or normal plane, and the other to the same angle below said plane. With the ailerons so adjusted it is evident that the impact of the wind on one aileron will have a tendency to lift one side of the machine, while the impact of the wind on the other will have a tendency to depress the other side of the machine. When my improvement is not employed, however, it often happens that when the ailerons are adjusted at various angles to each other, as described above, one of them will from one cause or another, receive a greater pressure than the other and thereupon produce a torque about the vertical axis of the machine and thereby tend to turn the machine from its course. In my invention, on the contrary, the ailerons may be not only so adjusted as to bring the machine to a lateral balance, but owing to the mechanism employed, the wind may or may not, as desired, at all times be utilized to cause an equal pressure to be exerted upon each aileron, no matter what the angle between them may be. And it results from this action that all disturbing torques about the vertical axis are obviated, or preserved or varied, according to the will of the operator. When the torque about the vertical axis is to be obviated the operation of my invention will be apparent if we suppose the yoke 5, to be moved to the left, as seen in Fig. 2, which motion will pull the cord 13 toward the left, and the aileron 8 down, as indicated. At the same time, the loop 26 will be pulled in the direction of the arrow and the aileron 9 will be forced up. The pressure of the wind will now raise the side of the machine on which the aileron 8 is located and lower the other side back to their balanced positions. At the same time, it is evident that the pressure of the wind will be equal on the two ailerons for the cord 13 and loop 26 may under such pressure readily move around their pulleys in directions opposite to that of the arrows until such wind pressures become equal. Of course, a movement of the yoke 5 to the right in Fig. 2, will raise the aileron 8 above and lower the aileron 9 below their normal planes, whereupon the machine will be tilted in an opposite direction and the pressure of the air on the ailerons will still remain equal. That a torque is produced around the vertical axis of the machine will be apparent in the case of the present ailerons which are not automatically adjustable, if we consider the effect of a sudden upward or downward variation of the wind. Such variations will produce on one aileron a greater pressure than on the other, owing to the variation in the angle of incidence; and, therefore, a disturbing torque is of necessity produced about the vertical axis, which torque is very objectionable in certain cases and may readily be fatal to successful flights. With my automatically adjustable ailerons it is equally clear no such torque can exist, for as soon as one aileron receives a slightly greater pressure than the other it automatically moves so as to decrease its pressure and causes the other to move so as to increase its pressure until they are in balance. In some cases, however, the operator may desire to obviate or destroy the automatic action of my ailerons, and to operate the machine in the old and well known manner, thereby producing or varying the torque around the vertical axis. In such cases, he may take hold of the cords 50 and 51 with his hands and suitably manipulate the ailerons, or he may take hold of the knobs 52 and 53 on said cords, or he may fasten one of said cords to the fork 6 or 7. In still other cases it may be desirable to turn both of the ailerons in the same direction. In order to accomplish this the operator may simply hold the yoke stationary and pull on one of the cords 50 or 51. In such cases the lowering of both ailerons will cause the machine to suddenly leap or jump upward in the air, and the ailerons may then be considered as set at an indefinitely small angle to each other.

In the form shown in Fig. 3, the same principles are present, but no cords are used. Instead of flexible connections, I employ two rods 30 and 31 to which the curved ailerons 8' and 9' are rigidly attached, and which rods carry collars 32 and 33 abutting against the supports 34 and 35. Each rod is provided with a pin 36 provided with a circumferential slot 39 in which play the prongs 40 of the yoke 5. It is evident in this form, if the operator moves the yoke 5 to the left in Fig. 3, the sleeve 38 will, through the cam slots 37 and pins 36 move the aileron 8' down and the aileron 9' up; and, of course, a reverse motion of the sleeve 38 will reverse the motions of said ailerons. At the same time, after having moved the yoke in one direction or another the wind may freely move said ailerons back into such a position that they will receive equal pressures.

It is evident that those skilled in the art may vary the details of construction and the arrangement of parts without departing from the spirit of my invention, and therefore, I do not wish to be limited to such features except as may be required by the claims.

What I claim is:—

1. In a flying machine, the combination of a plurality of lateral ailerons; and means for moving the same to different angles relatively to each other, comprising means permitting the ailerons to automatically so adjust themselves under the varying impact of the air as to receive equal pressures, substantially as described.

2. In a flying machine, the combination of a plurality of pivoted lateral ailerons; and flexible means under the control of the operator for moving said ailerons to different angles to each other, comprising means permitting said ailerons to automatically assume such positions under varying impacts of the air that they will receive equal pressures, substantially as described.

3. In a flying machine, the combination of a plurality of pivoted lateral ailerons; and flexible means adapted to be moved by the operator for adjusting said ailerons to different angles to each other, comprising means permitting said ailerons under the varying impacts of the air to freely assume such positions that they will receive equal pressures, substantially as described.

4. In a flying machine, the combination of a plurality of ailerons; and means by which said ailerons may be so moved as to exert during flight a torque about the longitudinal axis of the machine, comprising automatic means by which said ailerons are prevented from exerting a torque about the vertical axis of said machine, substantially as described.

5. In a flying machine, the combination of a plurality of lateral ailerons; supports on which the same are pivoted; a movable yoke or lever under the control of the operator; and flexible connections between said yoke and said ailerons by which the latter may be moved by the operator to any desired angle to each other and by the wind to such an angle as will cause said ailerons to receive equal pressures, substantially as described.

6. In a flying machine, the combination of a plurality of ailerons; supports on which the same are pivoted; a movable yoke under the control of the operator; connections between said yoke and said ailerons by which the latter may be moved by the operator to any desired angle to each other and by the wind to such an angle as will cause said ailerons to receive equal pressures; and means by which the operator may at will destroy said equal pressures and thereupon cause a torque to be exerted around the vertical axis of the machine, substantially as described.

7. In a flying machine, the combination of a plurality of lateral ailerons; means for moving the same into parallelism with each other and to various angles relatively to the wind, comprising means permitting said ailerons to later so adjust themselves under the varying impact of the air as to receive equal pressures, substantially as described.

8. In a flying machine in combination, a movable balancing surface at each side thereof; means for simultaneously presenting and holding said surfaces at opposite angles of incidence; and comprising means whereby changes in the direction of the air rush will automatically adjust said surfaces to maintain equal angles of incidence.

9. In a flying machine in combination, a movable balancing surface at each side thereof; a connection between them whereby movement of one by the air simultaneously moves the other in the same direction, normally-stationary operating means movable to shift said connection to present and hold said surfaces at opposite angles of incidence; said connection including a coupling with said operating means; allowing said surfaces and connection to move at all times; substantially as described.

10. In a flying machine, the combination of a plurality of ailerons and connections therebetween, said connections including means by which said ailerons are operated automatically to prevent them from exerting a torque about the vertical axis of the machine, and also means by which said ailerons may be so moved as to exert during flight a torque about the longitudinal axis of the machine.

11. In a flying machine, the combination of a plurality of ailerons, connections therebetween, said connections including means under the control of the operator for moving the ailerons in opposite directions to various angles relatively to the wind, and also means permitting said ailerons to later so automatically adjust themselves under the varying impact of the air as to secure equal pressures.

In testimony whereof, I affix my signature, in presence of two witnesses.

ALBERT FRANCIS ZAHM.

Witnesses:
T. N. WITHERSPOON,
PERCY H. RUSSELL.